United States Patent [19]

Sasaki

[11] Patent Number: 4,880,321

[45] Date of Patent: Nov. 14, 1989

[54] PRINTING APPARATUS FOR AUTOMATICALLY CONDUCTING A CARRIAGE RETURN

[75] Inventor: Ryoichi Sasaki, Nagoya, Japan

[73] Assignee: Brother Kogyo Kabushiki Kaisha, Japan

[21] Appl. No.: 122,917

[22] Filed: Nov. 17, 1987

[30] Foreign Application Priority Data

Nov. 20, 1986 [JP] Japan ................................. 61-277312

[51] Int. Cl.⁴ ................................................ B41J 5/30
[52] U.S. Cl. ......................................... 400/64; 400/7; 400/313
[58] Field of Search .................. 400/7, 63, 64, 313, 400/314, 314.1, 315, 317, 317.3, 342; 364/900

[56] References Cited

U.S. PATENT DOCUMENTS

| | | | |
|---|---|---|---|
| 1,509,228 | 9/1924 | Carino | 400/314 |
| 2,938,618 | 5/1960 | Niccolls | 400/315 |
| 3,023,876 | 3/1962 | Niccolls | 400/317.3 X |
| 3,386,552 | 6/1968 | Lorber et al. | 400/7 |
| 3,537,076 | 10/1970 | Damerau | 400/7 X |
| 3,631,957 | 1/1972 | Terry | 400/7 |
| 4,028,677 | 6/1977 | Rosenbaum | 400/7 X |
| 4,092,729 | 5/1978 | Rosenbaum et al. | 400/7 X |
| 4,181,972 | 1/1980 | Casey | 400/7 X |
| 4,244,031 | 1/1981 | Izushima et al. | 400/7 X |
| 4,330,217 | 5/1982 | Churgovich et al. | 400/64 |
| 4,574,363 | 3/1986 | Carlgren et al. | 400/7 X |
| 4,678,351 | 7/1987 | Curley | 400/7 X |

OTHER PUBLICATIONS

IBM Technical Disclosure Bulletin, "Automatic Carriage Return", Schaefer, vol. 11, No. 3, Aug. 1968, p. 261.

*Primary Examiner*—Ernest T. Wright, Jr.
*Attorney, Agent, or Firm*—Oliff & Berridge

[57] ABSTRACT

The disclosure relates to a printing device which includes so-called hot zones wherein a punctuation or hyphenation is automatically performed in accordance with a predetermined rule thereby letting users be free from the inconvenience of line end arrangements and also enabling users to pay attention to the text printed on the sheet when attention is needed for a particular format, since the printing is ordinarily conducted at least before the hot zone.

5 Claims, 7 Drawing Sheets

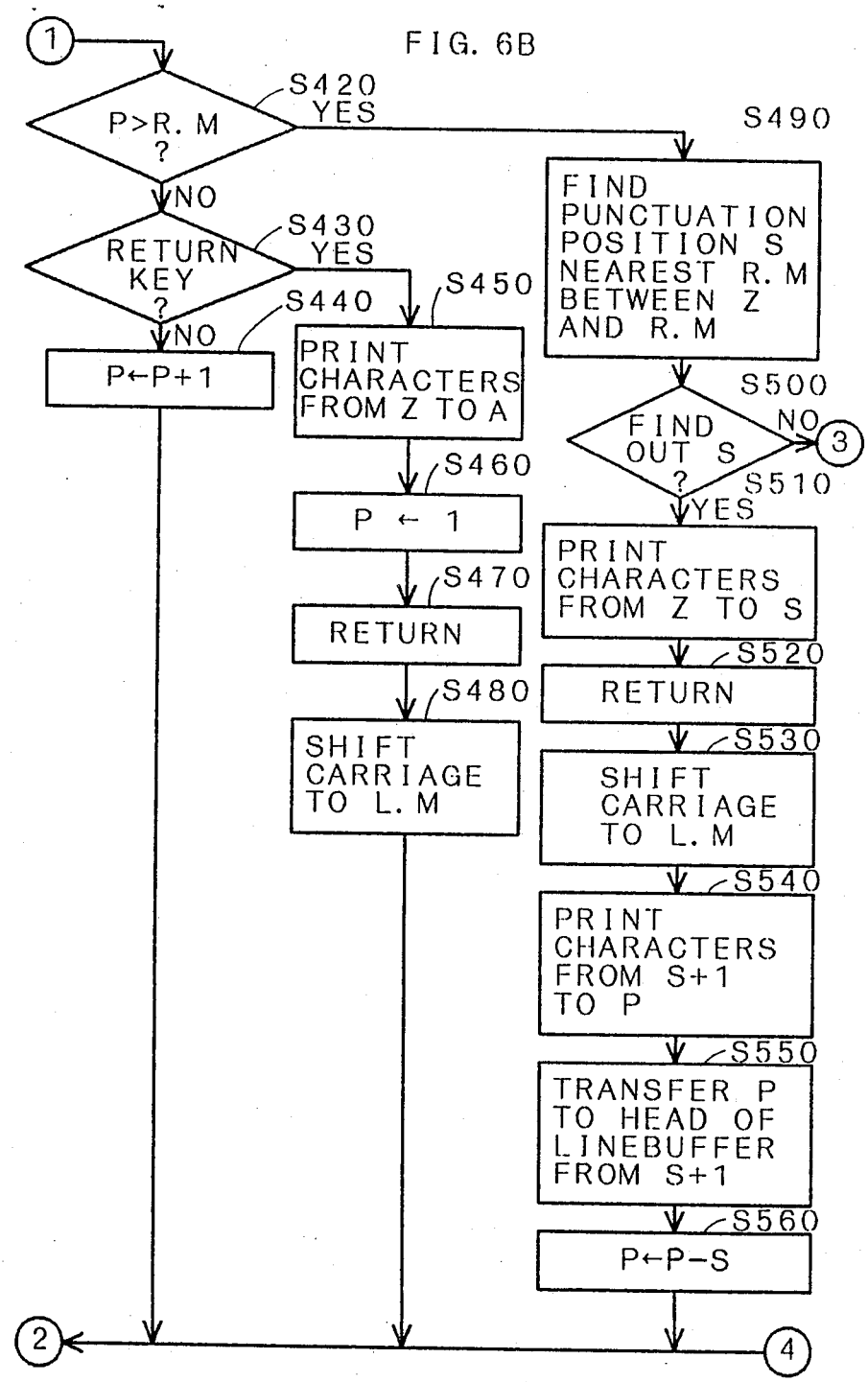

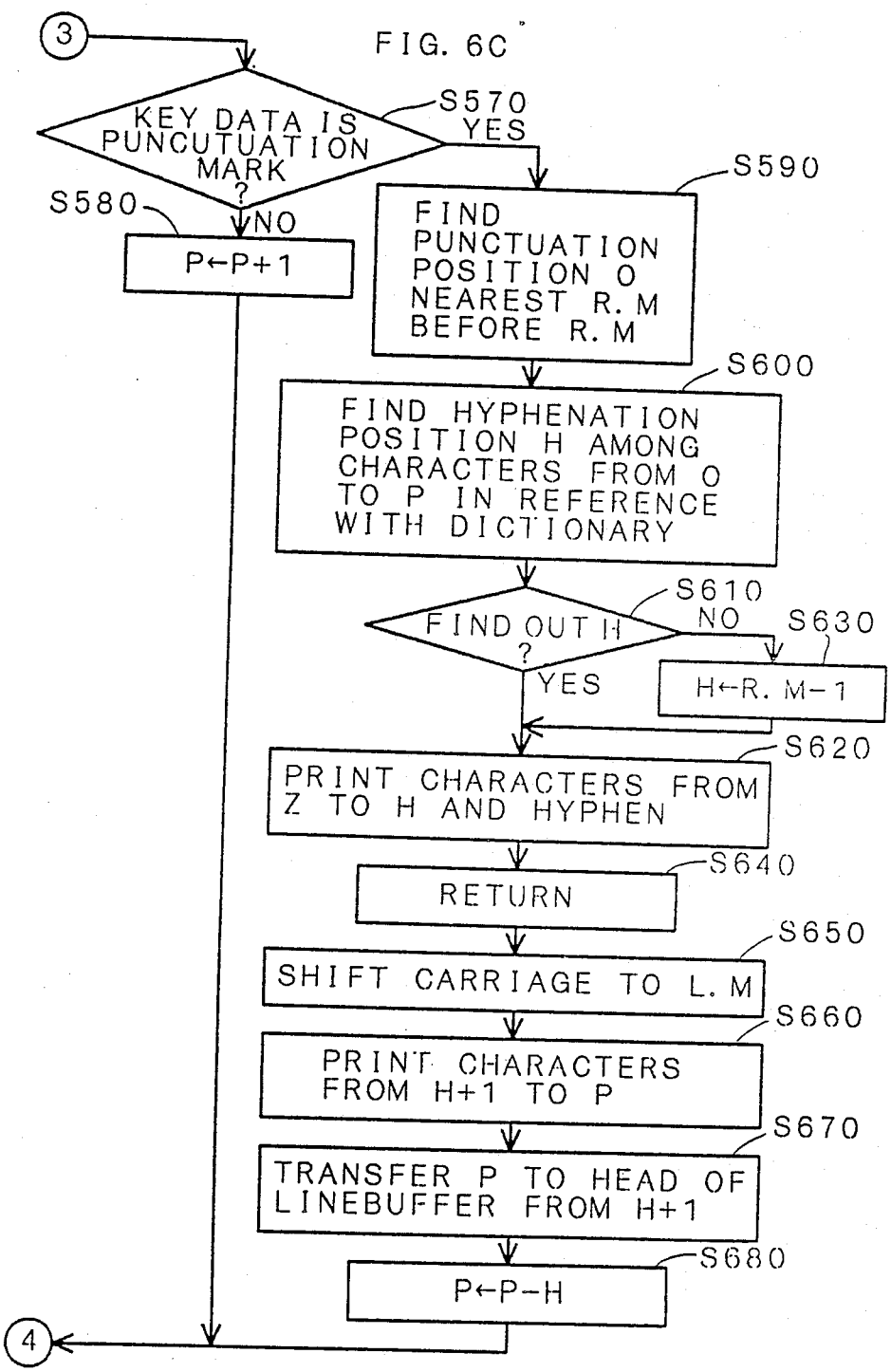

PRINTING APPARATUS FOR AUTOMATICALLY CONDUCTING A CARRIAGE RETURN

BACKGROUND OF THE INVENTION

The invention generally relates to a printing apparatus which automatically conducts a carriage return to the left margin on the next line when a printing head comes to the end of a line.

In printing apparatus, which are mostly familiar as typewriters, the function has been developed that the printing or typing head returns to the left margin on the next line automatically without using a carriage return key when it comes to the end of a line. It gives users more rhythmical typing and a neat looking arrangement for the text. Such functions operate in the manner that a special region called hot zone is provided in the proximity of the right margin so that the printing head is automatically advanced to the left margin of the next line when a user presses a key indicative of punctuation including a space key, or of hyphenation within the region thereof. In another case, they operate in the manner that input data per single line are temporarily stored in the memory in order to determine up to which point the current sentence could be printed on a single line so that the data before the determined point, which are of course punctuation marks or hyphenation, are printed out thereafter.

However, the invention now being disclosed is to counteract deficiencies of the above-introduced conventional printing apparatus. They have such deficiencies that in the former case the automatic carriage return does operate only on the occasion where a punctuation mark or a hyphenation is instructed within the hot zone. If no punctuation is necessary within the hot zone, the operator must decide to hyphenate the word or release the right margin so as to type the word thereover and then conduct the carriage return nonautomatically to the next line. Obviously such a series of operations means a great deal of inconvenience, interrupting and disturbing smooth, continuous and rhythmical typing.

In the latter case, the difficulty occurring in the former case is no longer a problem, however, the input data is stored per a whole line without printing even a word so that an operator has the inconvenience that, he has no way of knowing which position on the sheet the data currently input would be printed. It is quite inconvenient when the document in a particular form is desired, because it is difficult to arrange the text correctly in compliance with the previously formatted sheet, resulting in more difficulty for the layout.

SUMMARY OF THE INVENTION

It is an object of the invention to provide the printing apparatus of the automatic carriage return system which requires no break while typing in order to counteract such inconveniences mentioned above.

Summarizing the invention, the following shall be referenced with FIG. 1 diagrammatically showing the invention. According to the present invention, a printing apparatus for printing characters on a printing sheet 40 by a printing head P2, which comprises: input means P1 for inputting character data and punctuation data, memory means P4 for sequentially storing the input data and punctuation data, printing means P10 for printing characters along a printing line, by the printing head P2, corresponding to the character data and punctuation data, first control means P5 for controlling printing means P10 to print each character corresponding to the character data, when printing head P2 is located between a left margin and a predetermined position of the printing line, pause means P7 for controlling printing means P10 to pause when printing head P2 comes to a predetermined region lying between the predetermined position and a right margin, determination means P8 for determining if a set of characters, corresponding to a series of character data punctuated by the punctuation data, can be printed within the predetermined region, division means P9 for dividing the set of characters into two parts according to a predetermined rule when determination means P8 determines the set of characters can not be printed within the predetermined region, and second control means P6 for controlling the printing means P10 to print the set of characters within the predetermined region when determination means P8 determines the set of characters can be printed within the predetermined region, otherwise for controlling the printing means P10 to print a former part of the set of characters, divided by division means P9, in the predetermined region, and to print a latter part of the set of characters in the head of a next printing line.

In detail, data input from the input means P1 facilitates ordinary printing up to the predetermined point by the printing means P10, namely the printing is ordinarily performed by the printing head P2 onto the sheet 40, as shown in FIG. 1. The typing then comes to the predetermined point and the printing being performed by printing means P10 is delayed by the pause means P7, facilitating input data to be stored by the memory means P4. Data are only stored, not being printed in this predetermined region. When the data from such point up to the right margin are stored in the memory, the determination means P8 determines if it is possible to print the stored data within the predetermined region. The printing means P10 prints as it is stored if possible, and if not, it divides the data into two parts according to the predetermined rule so that the data could be thereafter printed over two lines.

In other words, the printing means P10 prints data in succession as they are entered up to the predetermined point, but after that point the data are stored in the memory so that the data are divided properly and thus printed onto right positions over lines. The operator need not pay any attention to where input data are to be typed whenever coming to the end of a line.

BRIEF DESCRIPTION OF ATTACHED DRAWINGS

The above and other objects of the invention may be understood with reference to the accompanying drawings, in which:

FIG. 1 diagrammatically and briefly shows the constitution of the present invention;

FIGS. 6A, 6B and 6C are flow charts in regard to the prescribed automatic carriage return system.

DETAILED DESCRIPTION OF THE PREFERRED EMBODIMENTS

Figure 2:
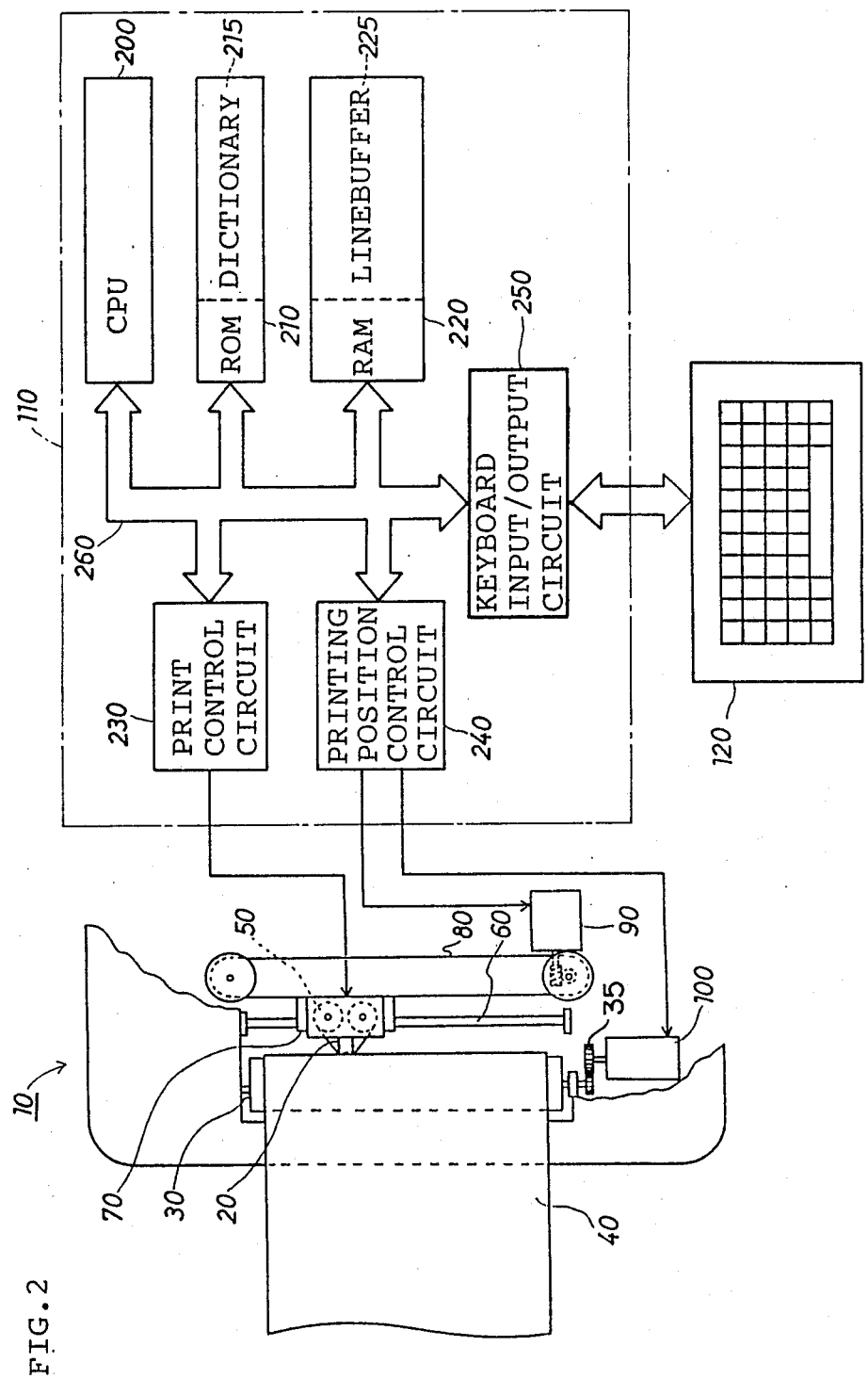
FIG. 2 shows the constitution of the first preferable embodiment.

The following explains one of the embodiments of this invention in conjunction with the attached drawings, first referring to FIG. 2 illustrating the first embodiment, an electronic typewriter 10.

The electronic typewriter 10 conducts printing with a printing head 20 on a sheet 40 which is provided at a platen 30. The printing head 20 is mounted on a carriage 70 with a printing ribbon 50 arranged ready for printing. The carriage 70 is provided on a guide shaft 60 so as to slide therealong and is activated by a stepping motor 90 specifically provided for the activation thereof via a belt 80. The printing head 20 is shifted along with the carriage movement to a desired position. The platen 30 is activated by another stepping motor 100 specifically provided for line feeding which is connected with the platen 30 via gears 35, so the sheet 40 is fed and vertically shifted to a desired position.

An electronic control device 110 controls the stepping motors 90 and 100, and the movement of the printing head 20 as well. The instructions or commands upon those facilities and moreover the text entry to be printed are conducted by operators by way of a keyboard 120, which is associated with the electronic control device 110.

The electronic control device 110 comprises a CPU (Central Processing Unit) 200, a ROM (Read Only Memory) 210, a RAM (Random Access Memory) 220, a print control circuit 230, a printing position control circuit 240, a keyboard input/output circuit 250 and a bus 260 connecting those facilities with each other. The print control circuit 230 is connected with the printing head 20 so as to control printing. The printing position control circuit 240 is connected with the stepping motors 90 and 100 so as to control the printing head position with regard to the sheet 40. The keyboard input/output circuit 250 is connected with the keyboard 120. In the RAM 220, a linebuffer 225 lodges at a predetermined address, which stores the input data per single line. Further in the ROM 210, a dictionary 215 also lodges at a predetermined address, which stores division positions syllables of a plurality of words namely indicative of hyphenation patterns thereof.

In the electronic typewriter 10 embodying the present invention, the right and left margins define the range of the printing zone. Particularly the space for nine characters before the right margin is called hot zone where the determinations are made in regard to the automatic carriage return system.

As data is entered by way of the keyboard 120, the printing head 20 prints characters corresponding to the data onto the sheet 40 continuously until it comes to the hot zone, where the characters are not printed but input data is stored until a proper determination is made.

Figure 1:
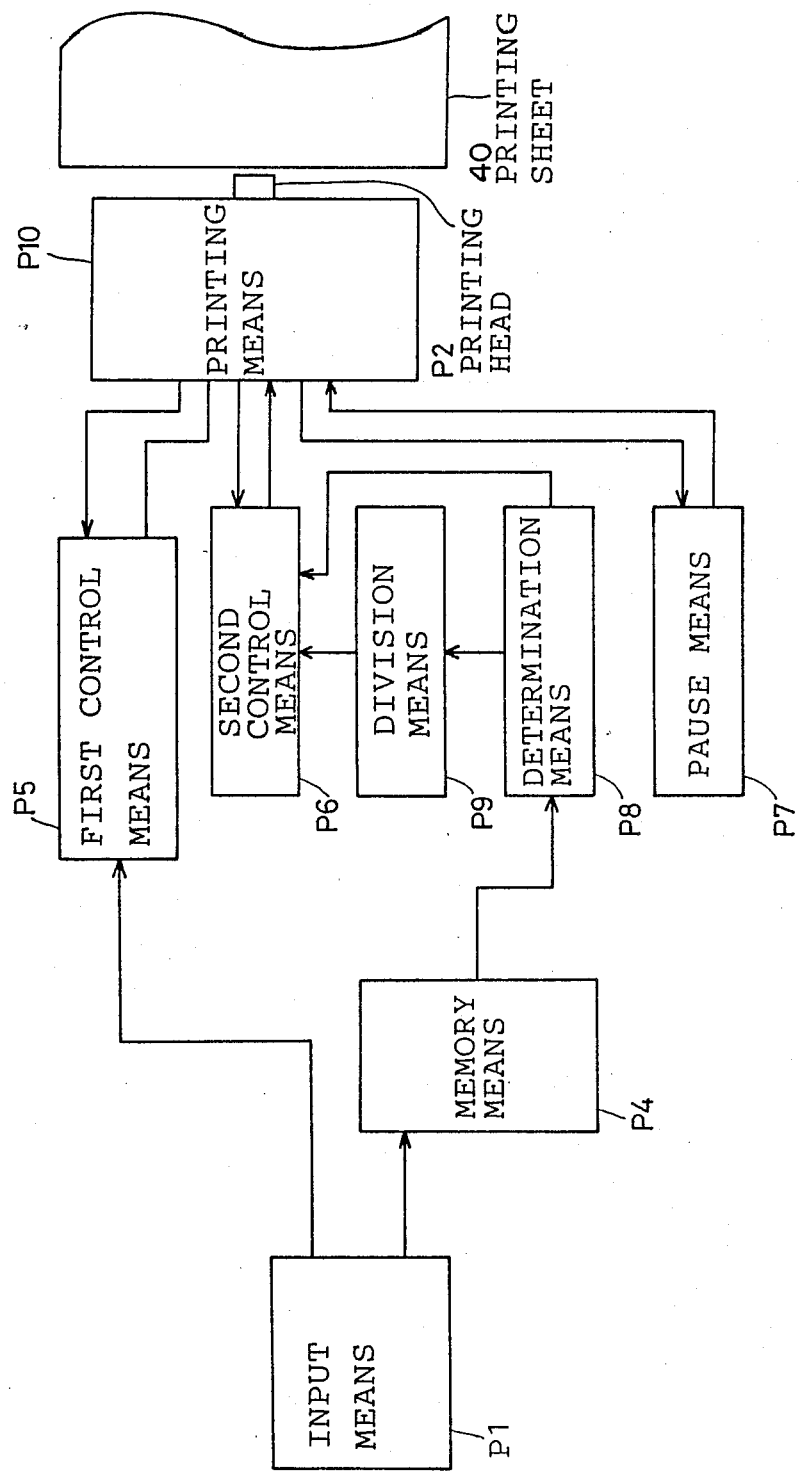

FIG. 2 is a specific embodiment of the printing apparatus diagrammatically shown in FIG. 1. The print control circuit 230 and printing position control circuit 240 in conjunction with electronic typewriter 10 correspond to printing means P10. Keyboard 120 and keyboard input/output circuit 250 serve as input means P1. Line buffer 225 acts as memory means P4, while CPU 200, ROM 210, RAM 220 in conjunction with line buffer 225 provides first control means P5, second control means P6, and determination means P8. The previous combination along with dictionary 215 represents division means P9. Pause means P7 is provided for by the combination of CPU 200 and ROM 210.

Figure 3A:
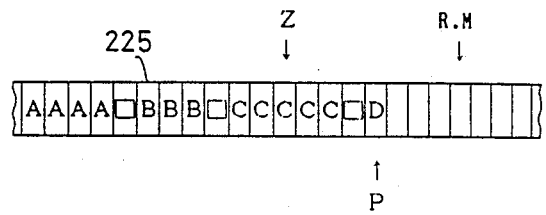
FIGS. 3A, 3B, 4A, 4B, 5A and 5B show a linebuffer and the sheet corresponding proximity of the hot zone and shall be referenced in regard to the automatic carriage return system including automatic hyphenation, embodied in the present invention.
Figure 3B:
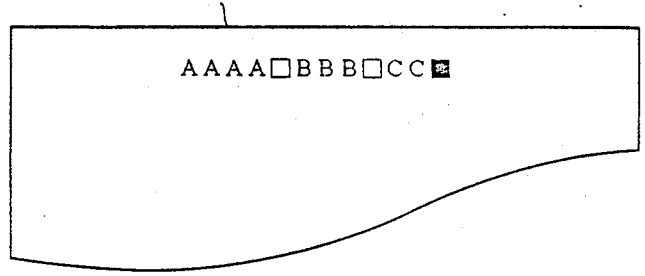

FIGS. 3A and 3B illustrate the data input and the printing thereof passing over the hot zone. FIG. 3A shows the linebuffer 225 supplied with data and FIG. 3B shows the printing thereof simultaneously performed on the sheet 40. Z denotes the beginning of the hot zone, R.M denotes the right margin and P denotes the current input data position indicated by a pointer in FIG. 3A. □ and ■ denote a space and a current printing head position respectively in FIG. 3B. Similar indications shall also be seen in FIGS. 4A, 4B, 5A and 5B. As shown in FIGS. 3A and 3B, the printing head 20 remains at the beginning of the hot zone Z even though the data are continuously entered past the hot zone.

When the input data becomes sufficient to reach the right margin R.M, subsequently a proper division or hyphenation is conducted so the characters are printed over two lines in accordance and thereafter the carriage 70 is automatically returned to the left margin on the next line.

Figure 4A:
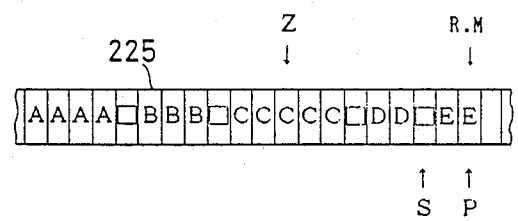

In detail, when the input data becomes sufficient to fill the line up to the right margin R.M as illustrated in FIG. 4A, the electronic control device 110 starts searching for a proper punctuation position S in the data in the hot zone. Particularly in the present embodiment, such punctuation marks are searched as a comma (,), a period (.) and a hyphen (-), including a space ( ). If the punctuation position S is found, the printing restarts such that data from Z to S are continuously printed in the hot zone and the rest, namely data after S, are printed on the next line.

Figure 5A:
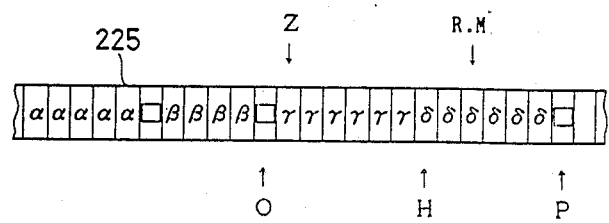

Conversely, if the punctuation position S is not found within the hot zone as illustrated in FIG. 5A, the data are sequentially stored until the next punctuation mark is input despite the right margin R.M. When any of the punctuation marks are recognized to be entered, then the punctuation position O closest to the right margin is searched within the left side thereof. Subsequently the word lying over the punctuation position O and the pointer P is properly hyphenated in reference with the dictionary 215 stored in ROM 210, and characters from the punctuation position O to the hyphenation position H are printed in the hot zone with hyphen as well. The remaining characters from the hyphenation position H to the later punctuation P are printed on the next line.

Figure 6A:
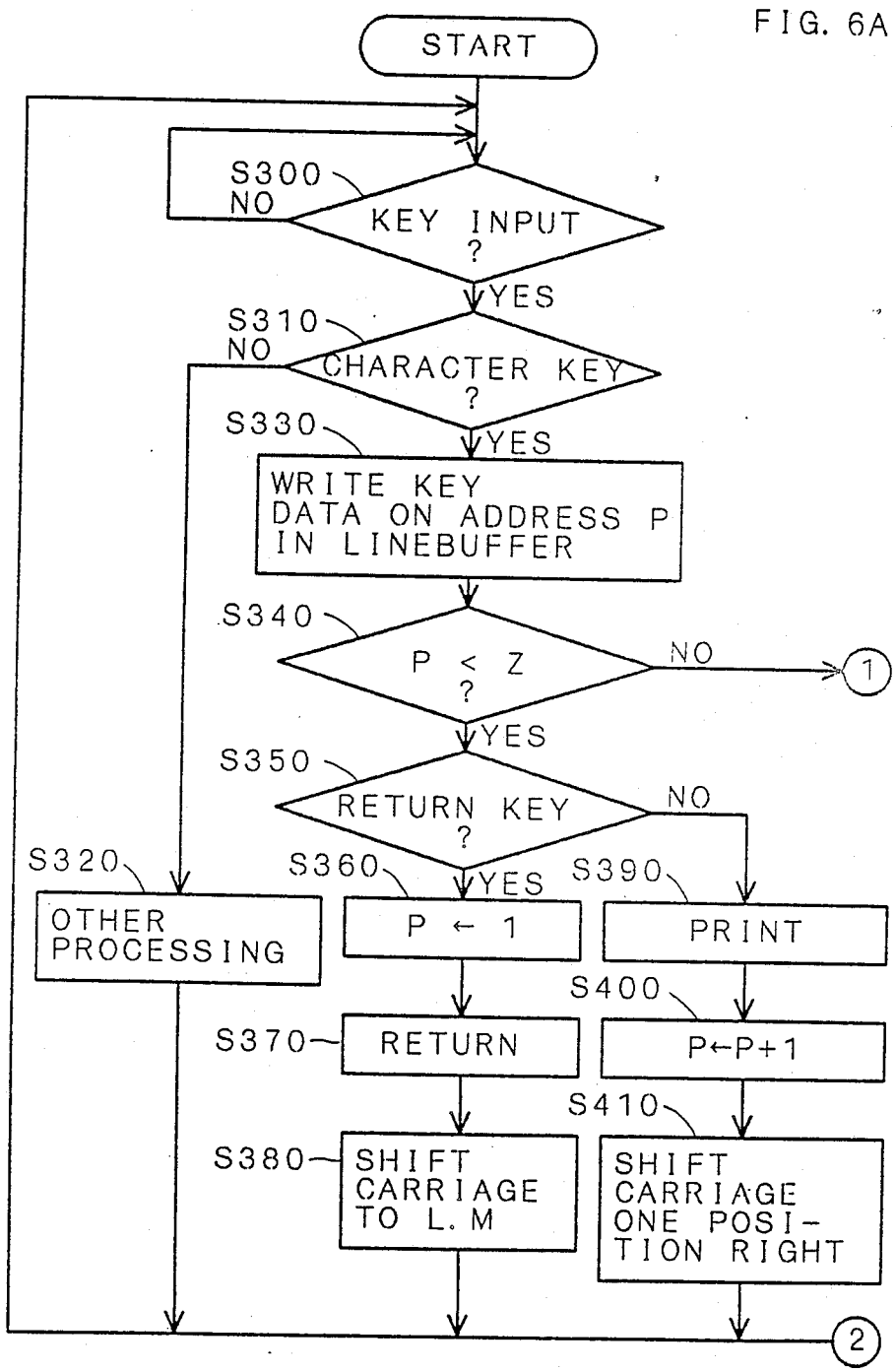

Flow charts of FIGS. 6A, 6B and 6C show the processes facilitating such a program as mentioned above. Each of the steps shall be simply denoted by the letter S in the following description.

After starting on the process, at S 300 keystrokes are initially recognized and at subsequent S 310 it is determined if the input is one of the character keys, which include keys representing alphabets, numerals, punctuation and special characters, a space and a carriage return. If it is determined at S 310 that the input is not any of the character keys, at S 320 other necessary processes are then forwarded in accordance. If it is determined at S 310 the input is a character key, at subsequent S 330 such key datum is then written on the particular address addressed by a pointer P in the linebuffer 225.

At S 340 the pointer P which comes beyond the beginning point Z of the hot zone is recognized. If the pointer P is still before Z, it is determined at S 350 if the input is of the carriage return key. In the case where the carriage return is instructed, at the next step S 360 the pointer P is initialized to be equal to 1, and at S 370 the sheet 40 is fed by the platen movement. At subsequent S 380, the carriage 70 is located at the left margin thereof and the process step then resumes S 300. Conversely, if at S 350 the return is not recognized, the program jumps to S 390 where the input datum is printed and at S 400, P is set equal to P+1. At subsequent S 410 the carriage 70 is then shifted to the next position right after such character datum is printed at S 390, and the process step resumes S 300.

Conversely, if at S 340 it is determined the pointer P is passing beyond Z (see FIGS. 3A and 3B), the program jumps to S 420 where it is then determined if the pointer P reaches the right margin R.M. In the case where it is determined NO at S 420 and moreover at the next step S 430 no carriage return key entry is recognized, at S 440, P is increased to P+1 so that the process step resumes S 300. On the other hand, if at S 430 the carriage return key entry is recognized, at S 450, characters are printed from Z up to the character the pointer P currently indicates. Then at S 460, S 470 and S 480 the pointer P is initialized and conduct the carriage return is conducted to the left margin on the next line in the same manner as the S 360, S 370 and S 380 are performed as described above.

Further when at S 420 it is recognized the pointer P reaches the right margin R.M, the present process step proceeds to S 490 where the punctuation position S nearest to R.M is searched among characters from Z to R.M. At subsequent S 500 it is then determined if the punctuation position S exists.

Figure 4B:
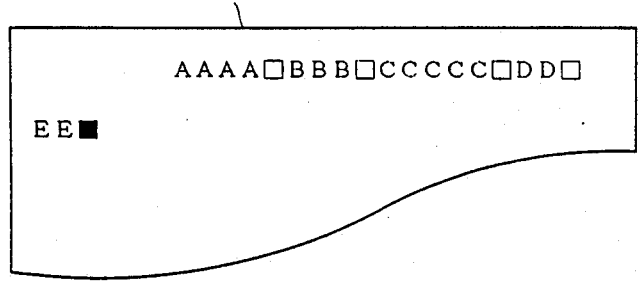

If the punctuation position S exists, S 510 through S 560 are taken up, which are illustrated in FIGS. 4A and 4B. In detail, at S 510 characters are printed from the beginning of the hot zone Z to the punctuation position S within the hot zone on the sheet 40. At S 520 and S 530 the carriage return is conducted to the left margin on the next line. At S 540 and S 550 printing is continued from characters after the punctuation position S up to the character the pointer P indicates and moreover the pointer P is transferred from the position S+1 to the head of the linebuffer 225. At S 560 pointer P is then set to be P minus S (P−S) and the process step resumes S 300.

Figure 5B:
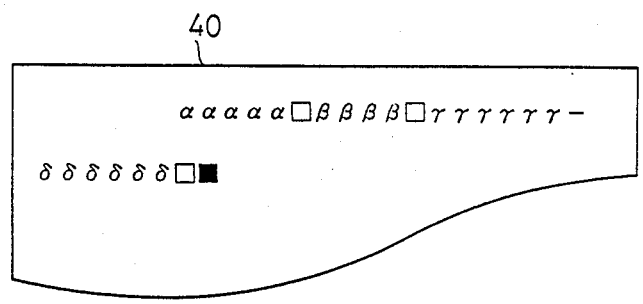

If at S 500 it is not determined the punctuation position S exists, the process follows S 570 through S 680 which are illustrated in FIGS. 5A and 5B. At S 570 it is determined if the input key datum indicates a punctuation mark and if not, at S 580 P is relocated to P+1 so as to resume the process step to S 300.

On the other hand, if the input key datum indicates a punctuation mark at S 570, at S 590 the proper punctuation position O closest to R.M within the left side thereof is searched in accordance with the linebuffer 225. At S 600 it is determined if the proper hyphenation position H exists among characters from Z to the next left position of the right margin R.M which lie between the punctuation position O and the pointer P in reference with the linebuffer 225 and the dictionary 215. If at the next step S 610 it is decided there exists the hyphenation position H, the printing is restarted based on the data from Z to H including a hyphen in the hot zone at S 620. However, if a plurality of hyphenation positions are found in S 610, the hyphenation position H closest to the right margin R.M shall be chosen in this embodiment. Conversely, if no proper hyphenation position is found at S 610 even referenced with the stored dictionary 215, S 620 prints determining the hyphenation position H upon one position left of the right margin R.M. Alternatively in this case, the whole word lying over the hot zone may be shifted to the next line so that no hyphenation would be made on the word. In succession, at S 640 and S 650 the carriage return is conducted to the left margin on the next line and at S 660, printing is started with the latter half of the hyphenated word, i.e. the character after the hyphenation position H up to the character the pointer P indicates. At S 670, the pointer P is transferred from the position H+1 to the head of the linebuffer 225 and at subsequent S 680 pointer P is set equal to P minus H (P−H).

As explained hereinbefore, the present embodiment enables users to make neat looking documents without caring so much about every line end. Moreover users can keep their attention on where the text is printed on the sheet, because the text is continuously printed as entered except in the hot zone.

Alternatively at S 600, the hyphenation position H may be searched, being nearest to R.M within the left side thereof so that a line can be extended as long as possible.

As a further alternative, the hot zone may be extended or reduced according to other objectives.

Obviously, many modifications and variations of the present invention are possible with regard to the above teachings. It is therefore to be understood that within the scope of the appended claims, the invention may be practiced other than as specifically described.

What is claimed is:

1. A printing apparatus for printing characters on a printing sheet by a printing head, which comprises:

input means for inputting character data and punctuation data, memory means for sequentially storing the character data and punctuation data, printing means for printing characters along a printing line, by the printing head, corresponding to the character data and punctuation data, first control means for controlling the printing means to print each character corresponding to the character data when the printing head is located between a left margin and a predetermined position of the printing line, pause means for controlling the printing means to pause when the printing head comes to a predetermined region lying between said predetermined position and a right margin and after said pause means is activated, said memory means sequentially stores said inputted character and punctuation data as a set of characters, determination means for determining if said stored set of characters, corresponding to a series of character data punctuated by said punctuation data, can be printed within the predetermined region, division means for dividing said set of characters into two parts according to a predetermined rule when said determination means determines said set of characters can not be printed within said predetermined region, and second control means for controlling said printing means to print said set of characters within said predetermined region when the determination means determines said set of characters can be printed within said predetermined region, otherwise for controlling the printing means to print a former part of said set of characters, divided by the division means, in said predetermined region, and to print a latter part of said set of characters in the head of a next printing line.

2. The printing apparatus according to claim 1, wherein said determination means forms a determination by searching the punctuation data in a memory area of the memory means corresponding to said predetermined region.

3. The printing apparatus according to claim 1, wherein said division means comprises a dictionary storing a division position data of a plurality of words, and divides said set of characters into two parts according to the division position data.

4. The printing apparatus according to claim 3, wherein the division means divides said set of characters at one position left of the right margin when said division data concerning with said set of characters is not found.

5. The printing apparatus according claim 1, wherein said second control means controls the printing means to print a hyphen after the former part of said set of characters.

* * * * *